H. H. BLANCHARD.
VALVE GRINDER.
APPLICATION FILED JAN. 16, 1919.
1,318,311.
Patented Oct. 7, 1919.
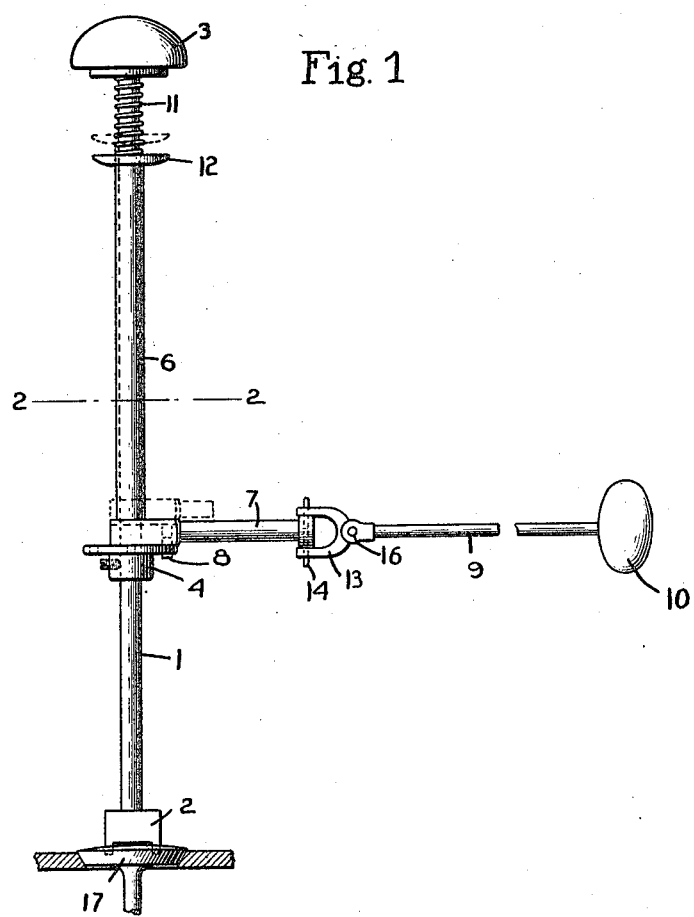
Fig. 1
Fig. 2.
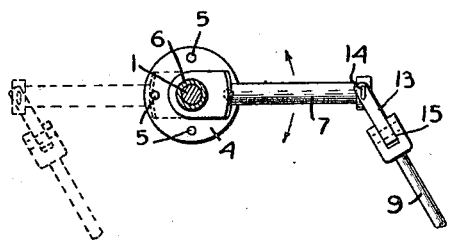
Inventor.
Harry H. Blanchard
by Heard Smith & Tennant
Attys.

UNITED STATES PATENT OFFICE.

HARRY H. BLANCHARD, OF BOSTON, MASSACHUSETTS.

VALVE-GRINDER.

1,318,311.  Specification of Letters Patent.  Patented Oct. 7, 1919.

Application filed January 16, 1919. Serial No. 271,375.

*To all whom it may concern:*

Be it known that I, HARRY H. BLANCHARD, a citizen of the United States, residing at Boston, county of Suffolk, State of Massachusetts, have invented an Improvement in Valve-Grinders, of which the following description, in connection with the accompanying drawing, is a specification, like characters on the drawing representing like parts.

This invention relates to a valve-grinding device such as is used for grinding the valves of internal combustion engines, and the object of the invention is to provide a novel device of this nature which is not only simple in construction and cheap to manufacture, but which is extremely efficient in operation and easy to manipulate.

In order to give an understanding of my invention, I have illustrated in the drawings a selected embodiment thereof which will now be described, after which the novel features will be pointed out in the appended claims.

In the drawings, Figure 1 is a side elevation of a device embodying my invention;

Fig. 2 is a section on the line 2—2, Fig. 1.

The device comprises a stem or rod 1 which is provided at its lower end with valve-engaging means 2 and at its upper end has a handle or knob 3 swiveled thereto. Fast on the rod is a collar 4 which is provided with a plurality of apertures 5. Loosely mounted on the rod is a sleeve 6 which has rigid therewith a laterally-extending arm 7 that is provided with a depending pin 8 adapted to enter any one of the apertures 5. The free end of the arm 7 has an actuating rod or handle 9 swiveled thereto preferably by a universal-joint connection. Said actuating rod or handle is preferably formed at its end with a knob 10 so that it may be easily grasped. 11 is a spring surrounding the stem 1 and situated between the handle 3 and the sleeve 6, said spring tending normally to force the sleeve downwardly and thereby to hold the pin 8 in one of the apertures 5. The upper end of the sleeve is provided with the lateral flange 12 which provides means for lifting the sleeve against the action of the spring thereby to disengage the pin 8 from the aperture 5 in the collar. Any suitable form of universal-joint connection between the actuating rod 9 and the arm 7 may be employed without departing from the invention. The construction shown comprises a yoke member 13 which straddles the end of the arm 7 and is pivoted thereto by the pivot 14 which extends parallel to the stem 1, said yoke member having an ear 15 which is connected to the handle 9 by a pivot 16 extending at right angles to the pivot 14.

In using the device the operator will grasp the handle 3 in his left hand and place the lower end 2 of the stem in operative engagement with the valve 17 and then he will grasp the knob 10 of the handle 9 in his right hand and by reciprocating the rod will give oscillating movement to the sleeve 6. Since the pin 8 of the sleeve 6 occupies one of the apertures 5, such oscillating movement will be communicated to the stem 1 and thus to the valve to be ground. The swivel connection between the rod 9 and the arm 7 is such that it permits the right hand of the operator to be placed in the most convenient position for giving the requisite oscillating movement to the stem. After the stem has been oscillated several times with the parts in the position shown in full lines Fig. 2, the operator may then swing the arm into a position 180° from that shown in full lines, or into that shown in dotted lines Fig. 2, thereby turning the valve around 180°, after which the valve may be oscillated through a relatively small arc in its new position. When it is time to again shift the position of the valve the operator may raise the sleeve against the action of the spring 11 by engaging the flange 12 with the fingers of the left hand and thereby withdraw the pin 8 from the aperture 5 which it occupies, and then swing the arm to bring the pin over another aperture 5, after which the sleeve will be released to allow the spring to lower said sleeve and bring the pin into said other aperture. In this new position the valve may be again oscillated, as above described.

By shifting the pin from one aperture to another, the valve may be given its combined oscillating and turning movement to properly effect the grinding thereof. The construction of the device is such that the required oscillating movement to the stem is given by a reciprocating movement of the handle for actuating the rod 9, and in actuating said rod or handle it may be held in the position most convenient to the operator.

I claim:

1. In a valve grinder, the combination with a rod having valve-engaging means at its lower end, of a handle swiveled to the upper end of the rod, a collar fast on the rod and having a plurality of apertures, a sleeve loosely mounted on the rod, an arm extending laterally from the sleeve and provided with a pin to enter one of said apertures in said collar, and an actuating rod swiveled to the end of the arm.

2. In a valve grinder, the combination with a rod having valve-engaging means at its lower end, of a handle swiveled to the upper end of the rod, a collar fast on the rod and having a plurality of apertures, a sleeve loosely mounted on the rod, an arm extending laterally from the sleeve and provided with a pin to enter one of said apertures in said collar, a spring acting on the sleeve and yieldingly holding said pin in said aperture, and an actuating rod having a universal joint connection with the end of the arm.

3. In a valve grinder, the combination with a rod having valve-engaging means at its lower end, of a knob swiveled to the upper end of said rod, a collar fast on the rod and having a plurality of apertures, a sleeve loosely mounted on the rod between the collar and the knob, a laterally-extending arm rigid with the sleeve, a pin extending from the arm and adapted to enter one of the apertures in the collar, an actuating rod swiveled to the arm, and a spring interposed between the sleeve and the knob.

4. In a valve grinder, the combination with a rod having valve-engaging means at its lower end, of a knob swiveled to the upper end of said rod, a collar fast on the rod and having a plurality of apertures, a sleeve loosely mounted on the rod between the collar and the knob, a laterally-extending arm rigid with the sleeve, a pin extending from the arm and adapted to enter one of the apertures in the collar, an actuating rod swiveled to the arm, and a spring interposed between the sleeve and the knob, said sleeve having a lateral flange at its upper end by which it may be lifted against the action of the spring.

In testimony whereof, I have signed my name to this specification.

HARRY H. BLANCHARD.